US011919611B2

(12) United States Patent
Koppert et al.

(10) Patent No.: US 11,919,611 B2
(45) Date of Patent: Mar. 5, 2024

(54) OFFSHORE ASSEMBLY COMPRISING A MOTION COMPENSATION PLATFORM CARRYING AN OBJECT WITH A HEIGHT OF 30-50 METERS OR MORE, MOTION COMPENSATION PLATFORM, AS WELL AS USE OF THE ASSEMBLY

(71) Applicant: Barge Master IP B.V., Rotterdam (NL)

(72) Inventors: Pieter Martijn Koppert, Rotterdam (NL); Berend Jan Hoogendijk, Rotterdam (NL)

(73) Assignee: Barge Master IP B.V., Rotterdam (NL)

( * ) Notice: Subject to any disclaimer, the term of this patent is extended or adjusted under 35 U.S.C. 154(b) by 0 days.

(21) Appl. No.: 17/925,963

(22) PCT Filed: Feb. 18, 2022

(86) PCT No.: PCT/NL2022/050085
§ 371 (c)(1),
(2) Date: Nov. 17, 2022

(87) PCT Pub. No.: WO2022/177430
PCT Pub. Date: Aug. 25, 2022

(65) Prior Publication Data
US 2023/0192251 A1 Jun. 22, 2023

(30) Foreign Application Priority Data
Feb. 19, 2021 (NL) .................................. 2027600

(51) Int. Cl.
*B63B 77/10* (2020.01)
*B63B 25/24* (2006.01)
*B63B 35/00* (2020.01)

(52) U.S. Cl.
CPC .............. *B63B 77/10* (2020.01); *B63B 25/24* (2013.01); *B63B 35/003* (2013.01)

(58) Field of Classification Search
CPC ....... B63B 77/10; B63B 25/24; B63B 35/003; B63B 2017/0072; B63B 25/28;
(Continued)

(56) References Cited

U.S. PATENT DOCUMENTS 3,577,659 A * 5/1971 Kail ..................... B25J 17/0216
403/77
3,948,467 A * 4/1976 Krusius ..................... B64F 3/00
244/116

(Continued)

FOREIGN PATENT DOCUMENTS

| CN | 111959704 A | 10/2020 |
|----|-------------|---------|
| CN | 111891299 A | 11/2020 |

(Continued)

OTHER PUBLICATIONS

PCT Notification of Transmittal of the International Search Report and the Written Opinion of the International Searching Authority, dated Apr. 28, 2022.

*Primary Examiner* — Gregory W Adams
(74) *Attorney, Agent, or Firm* — Hoffmann & Baron, LLP (57) ABSTRACT

An assembly includes an object with a vertical height of at least 30 metres placed on a bearing frame and a motion compensation platform including a base attached to a vessel. The platform includes an x-y actuator system for rotating the bearing frame with respect to the base about an x-axis and a y-axis, a sensor system configured to detect an x-axis rotating movement, and a y-axis rotating movement, and to generate a corresponding sensor signal, as well as an x-y control system configured to adjust the position of the bearing frame with respect to the base, depending on the sensor signal. The bearing frame is supported at a vertical distance above the base by means of a three-point support having a hinged, fixed first support and hinged second and (Continued)

third supports which are telescopic in the longitudinal direction of the z-axis.

14 Claims, 5 Drawing Sheets

(58) Field of Classification Search
CPC ....... B63B 27/30; B63B 27/10; B66C 13/063; B66C 13/02; B66C 23/53; B66C 23/52; F03D 13/10; F05B 2230/6102; F05B 2240/95
See application file for complete search history.

(56) References Cited

U.S. PATENT DOCUMENTS

| | | | | |
|---|---|---|---|---|
| 5,605,462 | A * | 2/1997 | Denne | H02K 7/00 434/45 |
| 5,947,740 | A * | 9/1999 | Kim | G09B 9/14 434/30 |
| 6,021,579 | A * | 2/2000 | Schimmels | F16M 11/18 33/645 |
| 6,902,488 | B2 * | 6/2005 | Hashimoto | A63G 31/16 472/130 |
| 7,124,660 | B2 * | 10/2006 | Chiang | G09B 9/02 901/16 |
| 7,909,303 | B2 * | 3/2011 | Bergmann | B23Q 1/5462 248/661 |
| 8,403,673 | B2 * | 3/2013 | Atluri | G09B 9/14 434/55 |
| 9,030,149 | B1 * | 5/2015 | Chen | F16M 13/04 318/648 |
| 9,174,747 | B2 * | 11/2015 | Kang | B64F 1/18 |
| 9,278,736 | B2 * | 3/2016 | Van Der Tempel | B63B 27/30 |
| 9,487,277 | B2 * | 11/2016 | van der Tempel | B63B 27/14 |
| 10,308,327 | B1 * | 6/2019 | Van Loon | F03D 13/10 |
| 2003/0075407 | A1 * | 4/2003 | Taylor | F16F 13/002 188/380 |
| 2003/0123957 | A1 * | 7/2003 | Jordan | B66C 13/02 414/138.2 |
| 2010/0122602 | A1 * | 5/2010 | Marcroft | B25J 17/0216 901/18 |
| 2012/0282064 | A1 * | 11/2012 | Payne | F03B 13/264 414/803 |
| 2015/0112638 | A1 * | 4/2015 | Morrow | B66C 13/46 702/182 |
| 2015/0121635 | A1 | 5/2015 | Prins | |
| 2017/0096196 | A1 * | 4/2017 | Foo | B66C 13/46 |

FOREIGN PATENT DOCUMENTS

| | | | | |
|---|---|---|---|---|
| DE | 102018002056 | A1 * | 9/2019 | ............ B63B 27/10 |
| EP | 2572976 | A1 | 3/2013 | |
| EP | 2853480 | A1 | 4/2015 | |
| EP | 3517479 | A1 | 7/2019 | |
| NL | 2015891 | B1 | 6/2017 | |
| WO | WO-2010114359 | A1 * | 10/2010 | ............ B63B 27/10 |
| WO | 2020/043256 | A1 | 3/2020 | |
| WO | 2020/231261 | A1 | 11/2020 | |

* cited by examiner

OFFSHORE ASSEMBLY COMPRISING A MOTION COMPENSATION PLATFORM CARRYING AN OBJECT WITH A HEIGHT OF 30-50 METERS OR MORE, MOTION COMPENSATION PLATFORM, AS WELL AS USE OF THE ASSEMBLY

CROSS-REFERENCE TO RELATED APPLICATIONS

This application is the National Stage of International Application No. PCT/NL2022/050085, filed Feb. 18, 2022, which claims the benefit of Netherlands Application No. 2027600, filed Feb. 19, 2021, the contents of which is incorporated by reference herein.

FIELD OF THE INVENTION

The invention relates to the field of the offshore, more particularly to a motion compensation device for use when displacing a load between a location on a vessel and a location outside said vessel.

BACKGROUND OF THE INVENTION

Usually, a crane is used to displace a load between a location on a vessel and a location outside said vessel. These cranes may be of different types. Generally, the crane has a jib or boom. This jib/boom may be made as a single unit or consist of several connected parts which pivot with respect to each other. In addition, the crane has a gripper for picking up a load. This gripper may comprise one or more hooks which are attached to the load at one or more attachment points, but may also comprise one or more claws or jaws by means of which the load is gripped. The gripper may be attached to and suspended from the jib/boom via a cable construction, but may also be attached directly to the jib or boom without the use of a cable construction. The present invention is basically usable with any type of crane.

When displacing a load between a location on a vessel and a location outside said vessel, problems occur due to the motion of the water. When picking up the load at a first location, transferring the load from the first location to the second location, and setting down the load at the second location, these two locations will move with respect to each other as a result of the water movement when one of these locations is situated on a vessel and the other location is situated outside said vessel. In particular when picking up and setting down the freight, the gripper may hit the load or the load hanging from the gripper may hit the first or second location. In both cases, this may result in considerable damage.

In order to prevent this problem, complicated platforms which compensate for water movement are known on which the load to be displaced and/or the crane is situated. Complicated constructions are also known to allow the crane to compensate for the water movement. In addition, in order to compensate only for the heave, heave compensators which are provided on the crane are known.

The problems caused by water movement are all the more common with objects which have large dimensions in the vertical direction. The vessel is subject to rolling—rotation about the horizontal longitudinal axis of the vessel—and pitching—rotation about the horizontal transverse axis of the vessel. Due to the vertical height of the object, a small movement at the bottom of the object results in a large displacement in the forward and/or lateral direction on the top side of the object.

NL-2.015.891 discloses a vessel with a so-called Stewart platform on which a crane is situated. As is common for a Stewart platform, the bearing frame, on which the crane is located, rests on the base of the Stewart platform by means of a six-point support. Each of the six-point support of this Stewart platform consists of a telescopic cylinder/piston unit. The base and the bearing frame of a Stewart platform may each be taken to be triangular. At each corner of the triangular base, the bottom end of two—viewed from the bottom to the top—mutually diverging cylinder/piston units is attached to the base, and at each corner of the bearing frame, the top end of two—viewed from the bottom to the top—diverging cylinder/piston units is attached to the bearing frame, so that the bearing frame is a 6 DOF (=Degrees of Freedom) bearing frame, that is to say the bearing frame has six degrees of freedom. These six degrees of freedom consist of three orthogonal translation directions and a rotation about every translation direction—thus 3 rotations about orthogonal axes of rotation in total.

WO-2020/231261 discloses a vessel with an erecting device for installing a wind turbine tower on a foundation pile. The specific objective of WO-2020/231261 is to be able to install the wind turbine tower on the foundation pile without requiring the use of a crane. In this case, the tower is supplied on the vessel in a horizontal position. Upon arrival at the destination location, the tower is placed vertically on the foundation pile by means of the erecting device. The erecting device is complicated and has a bearing frame which is supported on the vessel by means of a first suspension system and is supported on the foundation pile by means of a second suspension system. The first suspension system is a 5 DOF suspension consisting of a vertical pendulum (23), two horizontal support cylinders (24) which are arranged at an angle to each other, two vertical mutually parallel support cylinders (25), and a diagonal support cylinder (26). The second suspension system is a 6 DOF suspension, consisting of two vertical cylinders (33), two mutually parallel, horizontal cylinders (34), and two diagonal cylinders (25).

CN-111.959.704 seems to disclose a wave compensation system for a fish-processing installation on board of a vessel. This wave compensation system consists of three digital oil cylinders (1) which each have a bottom hinge support (2) and top hinge support (3), a working platform (60) supported by the three oil cylinders, an absolute value angle sensor 10, a base 11, and a six-axis position sensor. The platform is displaceable along the vertical axis and is rotatable about two horizontal axes which are perpendicular with respect to each other. The platform thus has a 3 DOF compensation for roll, pitch and heave.

WO 2020/043256 discloses that a crane is transferred from a vessel onto a foundation pile for a wind turbine. To this end, a crane coupling piece (402) is first placed on the foundation pile from the vessel and attached to the foundation pile. In order to manipulate the crane coupling piece, the crane—which is still situated on the vessel at that point—may be used. While the crane coupling piece is being manipulated, the crane is situated on a platform, see page 13, line 29 of this publication. Transferral of the crane itself to the foundation pile is also carried out from this platform. This platform is movable on wheels or rails—see page 16, lines 12-13 of this document—, rotatable about the vertical z-axis—see page 16, lines 30-31 of this document, and may be a platform which includes compensation for roll, pitch and heave, see page 25, lines 25-29 of this document. Tower segments are also arranged on the vessel which may be manipulated by means of the crane which is installed on the foundation pile, see page 15, lines 19-25 and page 28, lines 20-23. The platform may be used in order to transfer the tower segments to the foundation pile and be stabilized against movement, see page 25, lines 25-29. However, this document does not describe how the platform is supported on the ship and how the platform is compensated for movement.

Figure 1:
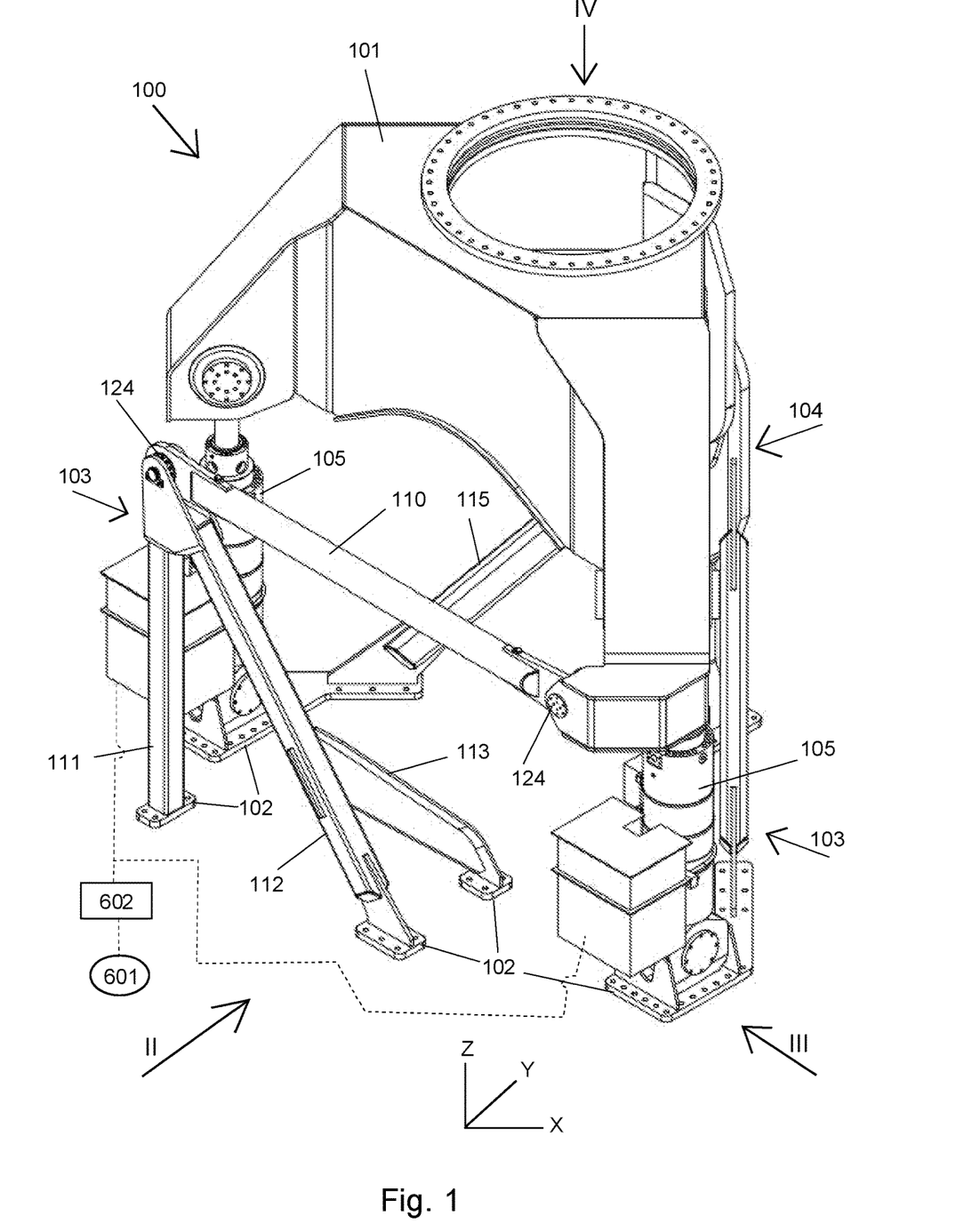
FIG. 1 shows a perspective view of a motion compensation platform according to the invention.
Figure 2:
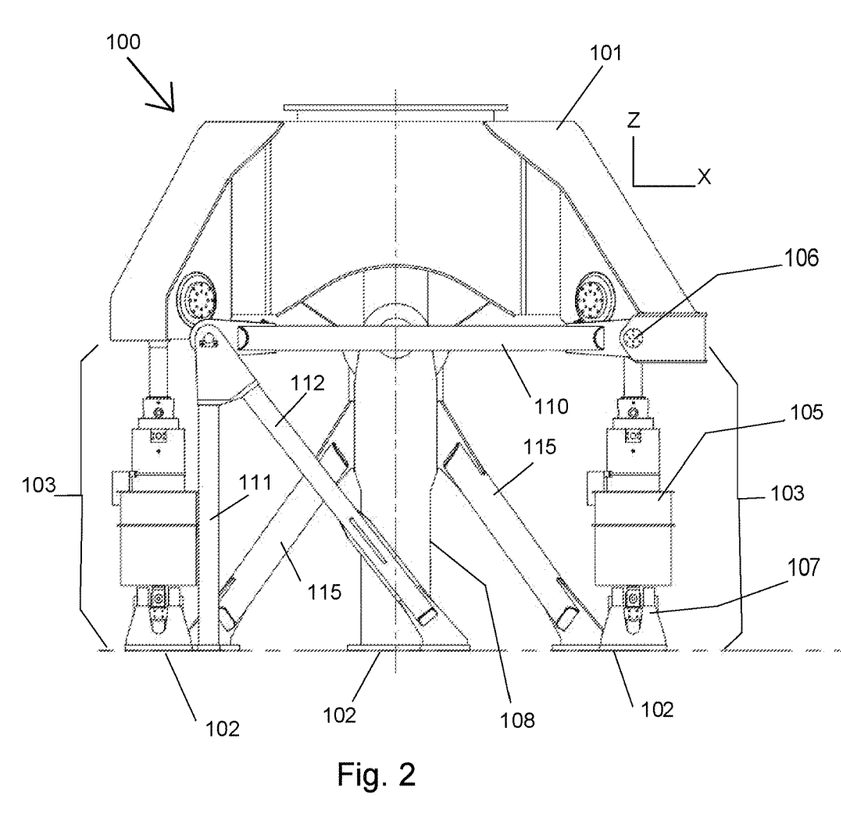
FIG. 2 shows a front view of the platform from FIG. 1, viewed in the direction of arrow II from FIG. 1.
Figure 3:
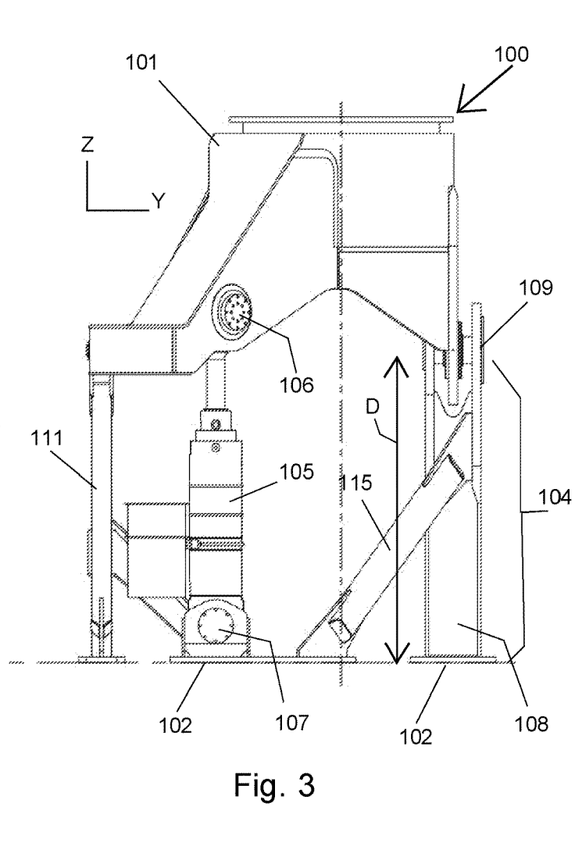
FIG. 3 shows a side view of the platform from FIG. 1, viewed in the direction of arrow III from FIG. 1.
Figure 4:
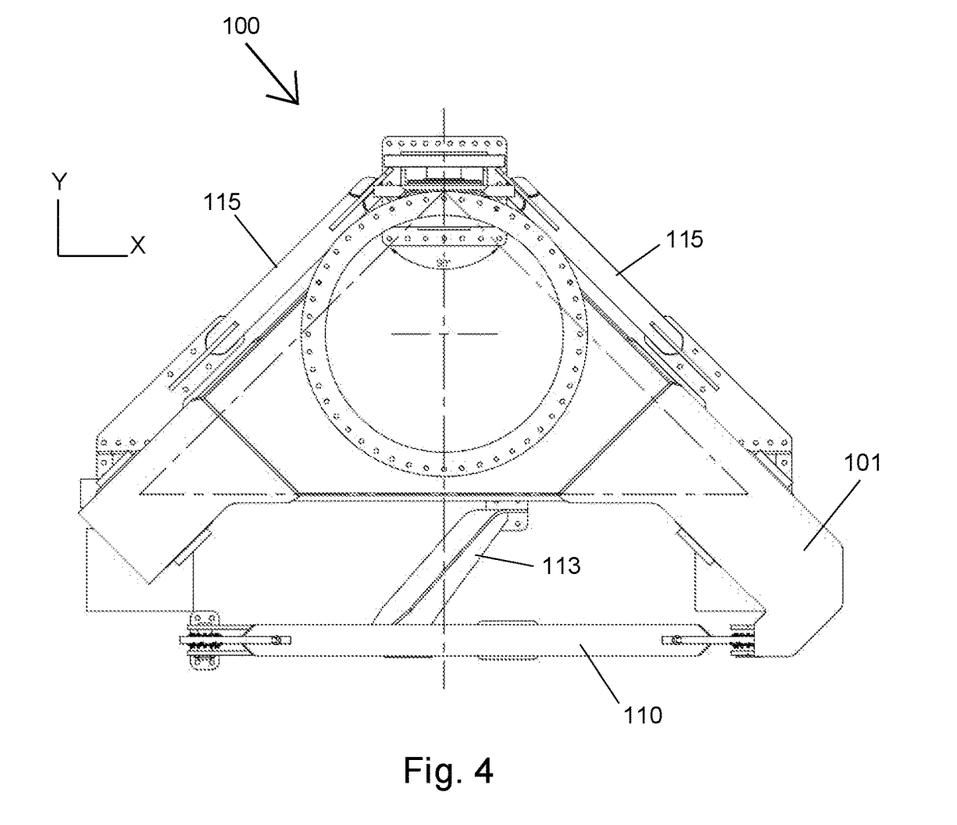
FIG. 4 shows a top view of the platform from FIG. 1, viewed in the direction of arrow IV from FIG. 1.

EP 2.572.976 discloses a system and method for lifting freight from a bearing frame on a vessel by means of a crane on a jack-up barge. The bearing frame is supported on the vessel by means of four or more hydraulic cylinders. In this case, a person (101) or optionally a heave sensor signals to the crane operator when the upper limit of a heave has been reached. The person (101) can see this visually by means of the loop (50) which is slack when the heave reaches its upper limit—see FIG. 3B—and does not have the triangular shape from FIG. 1. In response to this signal, the crane operator starts the hoisting operation of the crane. Because the hoisting operation starts when the upper limit of the heave has been reached, the platform (22) on which the hoisted load is situated will simultaneously descend. This prevents the load and the platform from being able to hit each other.

US 2015/121.635 discloses a vessel carrying a vertical column to which a gangway/goods bridge is attached for transferring personnel and goods to a wind turbine. A lift is provided on the column in order to take personnel and goods up. The personnel and the goods are then transferred to the wind turbine across the gangway. In order to be able to compensate for heave, the gangway is attached to the column so as to be hingeable about a horizontal axis. The column rests on the vessel by means of a cardan joint and two hydraulic cylinders 11.

It is an object of the present invention to provide a motion compensation platform comprising a base for rigidly connecting it to the vessel, and a bearing frame which is movable with respect to the base and which is controlled to move in such a way that movement or displacement of an object situated on the bearing frame, in particular a tall object, caused by the movement of the vessel is counteracted. In this case, it is an object of the present invention to provide an alternative for such a motion compensation platform. Yet another object of the invention is to provide a simplified motion compensation platform which can be controlled accurately, more particularly it is a further object to provide such a simplified motion compensation platform which is particularly well-suited for crane operations for displacing a load.

SUMMARY OF THE INVENTION

One or more of the abovementioned objects are achieved according to the invention by providing an assembly, comprising:
an object with a vertical height of at least 30 metres, such as 30-50 metres or higher,
a motion compensation platform comprising:
  a base which is attachable to a vessel, and
  a bearing frame on which the object is placeable or has been placed,
wherein the platform furthermore comprises:
  an x-y actuator system configured to rotate the bearing frame with respect to the base about an x-axis and a y-axis, wherein the x-axis, the y-axis and a vertical z-axis together define an imaginary system of orthogonal axes, and wherein the x-axis and y-axis together define a horizontal x-y plane;
  a sensor system configured to i) detect an x-axis rotating movement, and a y-axis rotating movement, and to ii) generate a sensor signal which is representative of an x-axis rotating movement and a y-axis rotating movement which the base is subjected to due to water movement; and
  an x-y control system configured to generate an x-y control signal in response to the received sensor signal in order to actuate the x-y actuator system in such a way that the position of the bearing frame with respect to the base is adjusted;
which assembly is characterized,
by the fact that, viewed in the longitudinal direction of the z-axis, the bearing frame is supported at a vertical distance above the base by means of a three-point support;
by the fact that a first support of the three-point support is a hinged, fixed support, which first, fixed support comprises a first hinge and is configured to:
  at least during the movement-compensating operation of the platform, define and maintain a predetermined fixed distance between the bearing frame and the base at the location of the first, fixed support, and
  by means of the first hinge, allow an x-axis rotating movement and a y-axis rotating movement of the bearing frame with respect to the base; and
by the fact that a second and third support of the three-point support each comprise a hinged support which is telescopic in the longitudinal direction of the z-axis, which telescopic supports form the x-y actuator system and are configured to be able to adjust the vertical distance between the bearing frame and the base at the location of the respective telescopic support, actuated by the x-y control signal, in such a way that the angular position of the bearing frame with respect to the base changes in order to be able to counteract changes in the angular position of the bearing frame with respect to the x-y plane.

According to the invention, the object has a vertical height of at least 30 metres. According to a further embodiment, this may be a height in the range of 30-50 metres or a height in the range of 45-55 metres. According to another further embodiment, the vertical height of the object may be, for example, at least 40 metres or at least 45 metres. According to yet another further embodiment, the vertical height of the object may be more than 50 metres or even more than 100 metres. The vertical height of the object may be a height, for example, in the range of 40-75 metres, such as 45-75 metres or 50-75 metres, or even in the range of 70-150 metres. The object may, for example, be the tower of an offshore wind turbine. Such towers may have a height of more than 100 metres, or even more than 200 metres.

The first, fixed support may comprise a column or similar construction with a hinge at one end of the column/similar construction or at both ends of the column/similar construction. The column or similar construction may have a non-variable length which defines the predetermined fixed distance. Alternatively, the column or similar construction may also have a variable length which is fixed during movement-compensating operation of the platform at a fixed length which defines the predetermined fixed distance. What matters is the fact that the first, fixed support during movement-compensating operation of the platform is a passive element. In this case, the expression passive element is understood to mean an element which is not actuated to move the bearing frame with respect to the base during movement-compensating operation of the platform. Therefore, the distance between the bearing frame and the base will not change at the location of the first support during movement-compensating operation.

The sensor system may measure, for example, the x-rotating movement and y-rotating movement of the base or the vessel and, on the basis thereof, generate the sensor signal which is representative of the x-axis rotating movement and the y-axis rotating movement which the base is subjected to due to water movement. However, the sensor system may also measure a different x-rotating movement and/or different y-rotating movement and, on the basis thereof, determine, optionally by means of different input signals, a sensor signal which is representative of the x-axis rotating movement and the y-axis rotating movement which the base is subjected to due to water movement. Thus, the sensor system may, for example, also measure the x-rotating movement and y-rotating movement of the bearing frame or an object placed thereon and, on the basis thereof, generate the sensor signal which is representative of the x-axis rotating movement and the y-axis rotating movement which the base is subjected to due to water movement.

As a result of the 3-point support which consists of one fixed support and two supports which are movable in the length direction of the z-axis and are in particular telescopic, the platform according to the invention may be of a slim design and use a minimal number of actuators, the power required to actuate the actuators in addition being reduced by the fact that the mass of the bearing frame and the object placed thereon is partly to substantially borne by the fixed support.

The x-y control system may be configured to generate an x-y control signal in response to the received sensor signal which actuates the x-y actuator system in such a way that changes in the angular position of the bearing frame with respect to the x-y plane which the bearing frame would be subjected to due to the movement which the base experiences are neutralized—at least insofar as this is possible within the range of adjustability of the bearing frame with respect to the base—or substantially counteracted.

According to a further embodiment of the invention, the sensor system is furthermore configured to i) detect an x-axis translational movement and a y-axis translational movement of the vessel, and to ii) generate a sensor signal which is representative of an x-axis translational movement and a y-axis translational movement which the top side of the object would be subjected to due to water movement; and the x-y control system is configured to generate an x-y control signal in response to the received sensor signal which actuates the x-y actuator system in such a way that changes in the x-position and the y-position of the top side of the object are counteracted, in particular are minimized.

The sensor signal from claim 2 which is representative of an x-axis translational movement and a y-axis translational movement which the top side of the object would be subjected to due to water movement and the sensor signal from claim 1 which is representative of an x-axis rotating movement and a y-axis rotating movement which the base experiences due to water movement may be one and the same signal. This one and the same signal will then contain information relating to both the x-axis rotating movement and the y-axis rotating movement which the base experiences, as well as the x-axis translational movement and the y-axis translational movement which the top side of the object would be subjected to, and the x-y control system will then be configured in such a way as to be able to differentiate this information if necessary. However, it is also readily conceivable to use several signals which are all fed to the x-y control system. In both cases, the x-y control system will generate an x-y control signal in response to the received sensor signal or the received sensor signals, respectively, which actuates the x-y actuator system in such a way that changes in the x-position and the y-position of the top side of the object are counteracted, in particular are minimized. In particular, the x-y control system will be configured to generate an x-y control signal which actuates the x-y actuator system in such a way that changes in the x-position and the y-position of the top side of the object are neutralized, at least insofar as this is possible within the range of adjustability of the bearing frame with respect to the base.

In this way, the top side of the object can be kept in position at great height above the vessel with respect to the fixed world, not only when the vessel experiences rolling and/or pitching movements, but also when the vessel is subjected to surging and/or swaying or drifting in the horizontal plane.

According to yet a further embodiment of the invention, the projection of the first, second and third support on the horizontal plane enclosed by the x-axis and y-axis defines three corners of a triangle, such as the corners of an isosceles or equilateral triangle.

According to yet another further embodiment of the invention, the second and third support each consist of a single (that is to say at least one and at most one) cylinder-piston-actuator unit which is connected to the base via a base-hinge and is connected to the bearing frame via a bearing frame-hinge, wherein the bearing frame-hinge is configured to allow an x-axis rotating movement and a y-axis rotating movement of the bearing frame with respect to the cylinder-piston-actuator, and wherein the base-hinge is configured to allow an x-axis rotating movement and a y-axis rotating movement of the base with respect to the cylinder-piston-actuator. In this case, a cylinder-piston-actuator unit may consist of a single cylinder-piston-actuator or of several cylinder-piston-actuators which are coupled in such a way that they function as one cylinder-piston.

According to yet another further embodiment of the invention, the first support consists of a rigid structural part which defines the predetermined fixed distance, and one single hinge, in such a way that, at the location of the first support, a translation-less connection between the bearing frame and the base is achieved.

According to yet another further embodiment of the invention, the platform furthermore comprises a mechanical constraining system which is configured to:
  restrict a z-axis rotating movement of the bearing frame with respect to the base, and
  restrict or prevent an x-axis translational movement, a y-axis translational movement, and
  a z-axis translational movement of the bearing frame with respect to the base.

According to the invention, the expression 'restricting a movement' is understood to mean limiting the respective movement to a very small movement which is required to allow the y-axis rotating movement and the x-axis rotating movement of the bearing frame with respect to the base which is imposed by the x-y actuator system. According to the invention, the expression 'preventing a movement' is understood to mean to make it impossible to perform the respective movement. In this way, the bearing frame is prevented from being able to drift off with respect to the base (in an uncontrollable manner).

According to the invention, the mechanical constraining system may be configured in various ways.

According to a first further embodiment, the mechanical constraining system comprises a first push/pull rod which extends in a horizontal direction and which is attached, on the one hand, to the base and, on the other hand, to the bearing frame in order to restrict the z-axis rotating movement of the bearing frame with respect to the base. According to another further embodiment of this first embodiment, the mechanical constraining system furthermore comprises a second push/pull rod which extends in a horizontal direction and which is attached, on the one hand, to the base and, on the other hand, to the bearing frame and which, viewed in the horizontal plane, runs at an angle to the first push/pull rod in order to restrict an x-axis translational movement and a y-axis translational movement of the bearing frame with respect to the base together with the first push/pull rod. According to yet another further embodiment, the mechanical constraining system may in addition comprise a third push/pull rod which is attached, on the one hand, to the base and, on the other hand, to the bearing frame. This third push/pull rod may be situated at a distance from and parallel to the second push/pull rod.

According to a second further embodiment, the mechanical constraining system comprises the first support, and the first support is configured to prevent the x-axis translational movement, the y-axis translational movement, and the z-axis translational movement of the bearing frame with respect to the base.

According to yet another further embodiment of the invention, the assembly according to the invention furthermore comprises a vessel, wherein the platform is mounted on the vessel and the object is situated on the bearing frame with its vertical height extending in the z-direction. According to a further embodiment, the vessel may in this case be provided with an anchoring system and/or a dynamic positioning system, wherein the anchoring system and/or a dynamic positioning system are configured to counteract or even prevent an x-axis translational movement and/or a y-axis translational movement and/or a z-axis rotating movement of the vessel. In this case, the dynamic positioning system may cooperate with the anchoring system or the vessel may in this case use only the anchoring system or only the dynamic positioning system. A dynamic positioning system is a system which, usually on the basis of GPS data, actuates the propulsion means of the vessel in order to maintain a certain position.

According to a further embodiment of the invention comprising a vessel, wherein the assembly furthermore:
  comprises a load which is provided with a load engagement point and a crane which is provided with a gripper configured for picking up the load at the load engagement point, wherein the object is the load or the crane; and
  comprises a heave compensator comprising:
    a z-actuator configured to:
      move the gripper with respect to the fixed world, or move the load engagement point with respect to the load;
    a z-sensor configured for detecting a z-axis movement of the gripper with respect to the load engagement point and for generating a z-sensor signal which is representative of the detected z-axis movement, wherein the z-axis movement is a movement in the direction of the z-axis;
    a z-control system which is configured to generate, when the gripper is within a predetermined distance of the load engagement point and/or of the vessel, a z-control signal in response to the z-sensor signal which actuates the z-actuator in such a way that the load is prevented from being able to hit the gripper when the gripper is free from the load, due to the z-axis movement.

Since the z-control system only has to become operative when the gripper is near the load engagement point or near the vessel and may be disruptive when the gripper is far from the vessel, the control system is in this case configured to generate the z-control signal when the gripper is within a predetermined distance of the load engagement point and/or from the vessel.

By means of this assembly according to the invention, the object which has been placed on the platform may be corrected by means of the x-y actuator system for pitching and rolling of the vessel, as well as any drifting of the vessel—that is to say surging and swaying—while the gripper is prevented from hitting the load due to heaving of the vessel as a result of the z-actuator. Both the x-y actuator and the z-actuator are simple actuators which are controllable by means of simple control algorithms independently of each other. Thus, the entire assembly can be kept simple and easy, resulting in a very reliable control behaviour which is achievable by simple means and at (relatively) low costs.

According to yet a further embodiment of the invention comprising a vessel, the crane may be a crane which is fixed with respect to the fixed world, such as a crane placed on a jack-up barge.

According to yet a further embodiment of the invention comprising a vessel, the z-actuator may be:
  attached on or to the load and configured to move the load engagement point in the z-axis direction with respect to the rest of the load;
  or
  attached on or to the crane and configured to move the gripper in the z-axis direction with respect to the fixed world.

According to yet another further embodiment of the invention, the object is a tower or tower section of a wind turbine. The tower of a wind turbine respectively a tower section of a wind turbine is the portion of the wind turbine which protrudes substantially above the water in order to carry the rotor housing with the rotor. In contrast to the foundation portion of a wind turbine which is situated under water, the tower or a section thereof is a relatively delicate construction. For this reason, a tower or tower section is preferably moved across the water to its destination location in a vertical position. The reason for this is that this relatively delicate component of a wind turbine then does not have (no longer has) to be moved from a horizontal position to a vertical position at the destination location. When placing a tower or tower section on a vessel for transportation, it may immediately be placed in a vertical position on the carrier frame of a platform according to the invention.

According to a further aspect, the invention relates to a platform from or of the assembly according to the invention. Such a platform is particularly suitable for use in the assembly according to the invention.

According to yet a further aspect, the invention relates to the use of an assembly for the offshore unloading of a tower or tower section of a wind turbine which has been arranged vertically on a vessel. According to a further embodiment thereof, the tower or tower section is arranged in a vertical position on the bearing frame during loading onto the vessel; after loading, the tower or tower section is then taken to its offshore destination by the vessel and the tower or tower section is unloaded at its offshore destination by means of the assembly according to the invention.

BRIEF DESCRIPTION OF THE DRAWINGS

The invention will be explained in more detail with reference to the drawings, in which.

DETAILED DESCRIPTION OF THE INVENTION

Figure 7:
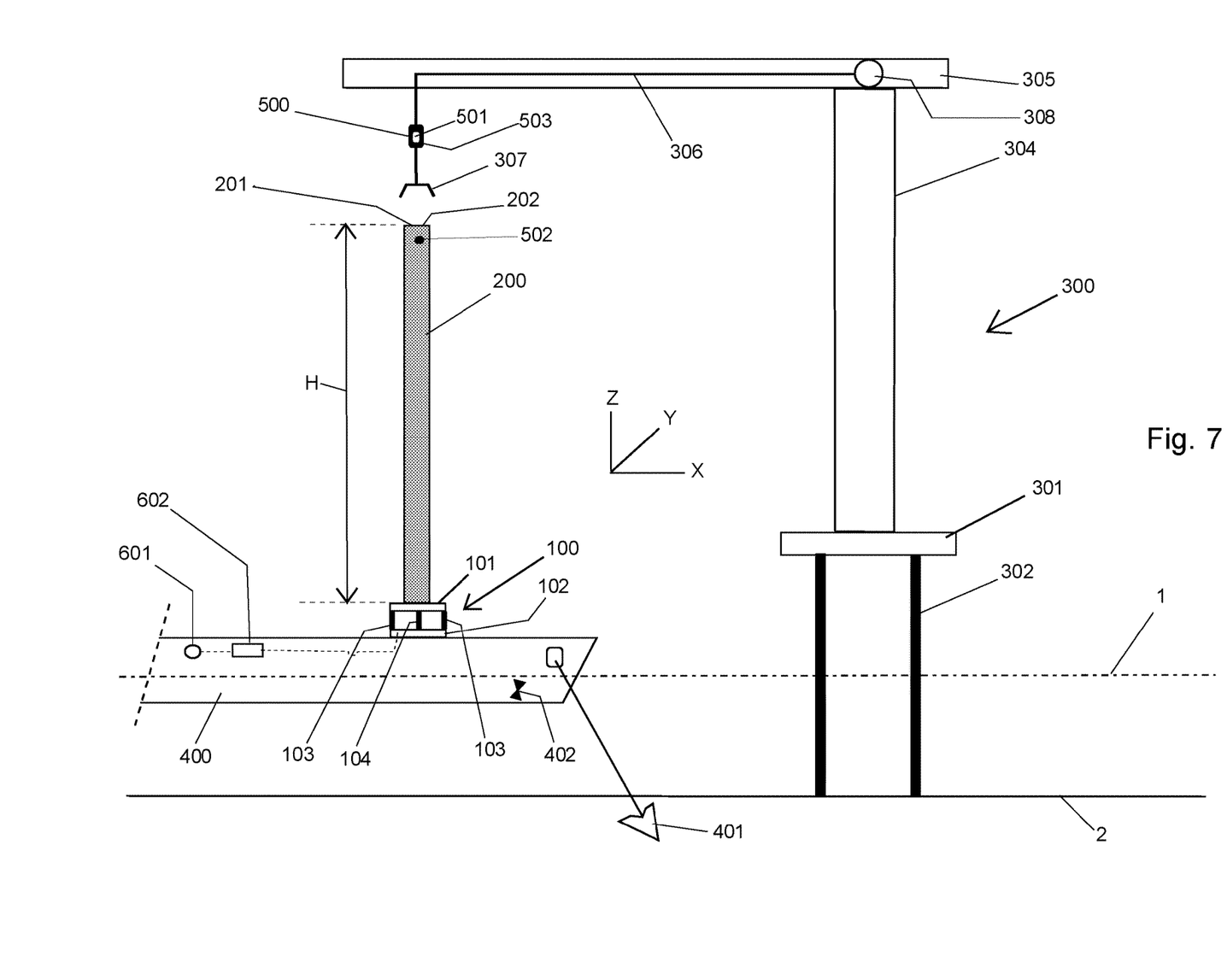
FIG. 7 shows a highly diagrammatic representation of a first exemplary embodiment of the assembly according to the invention.
Figure 8:
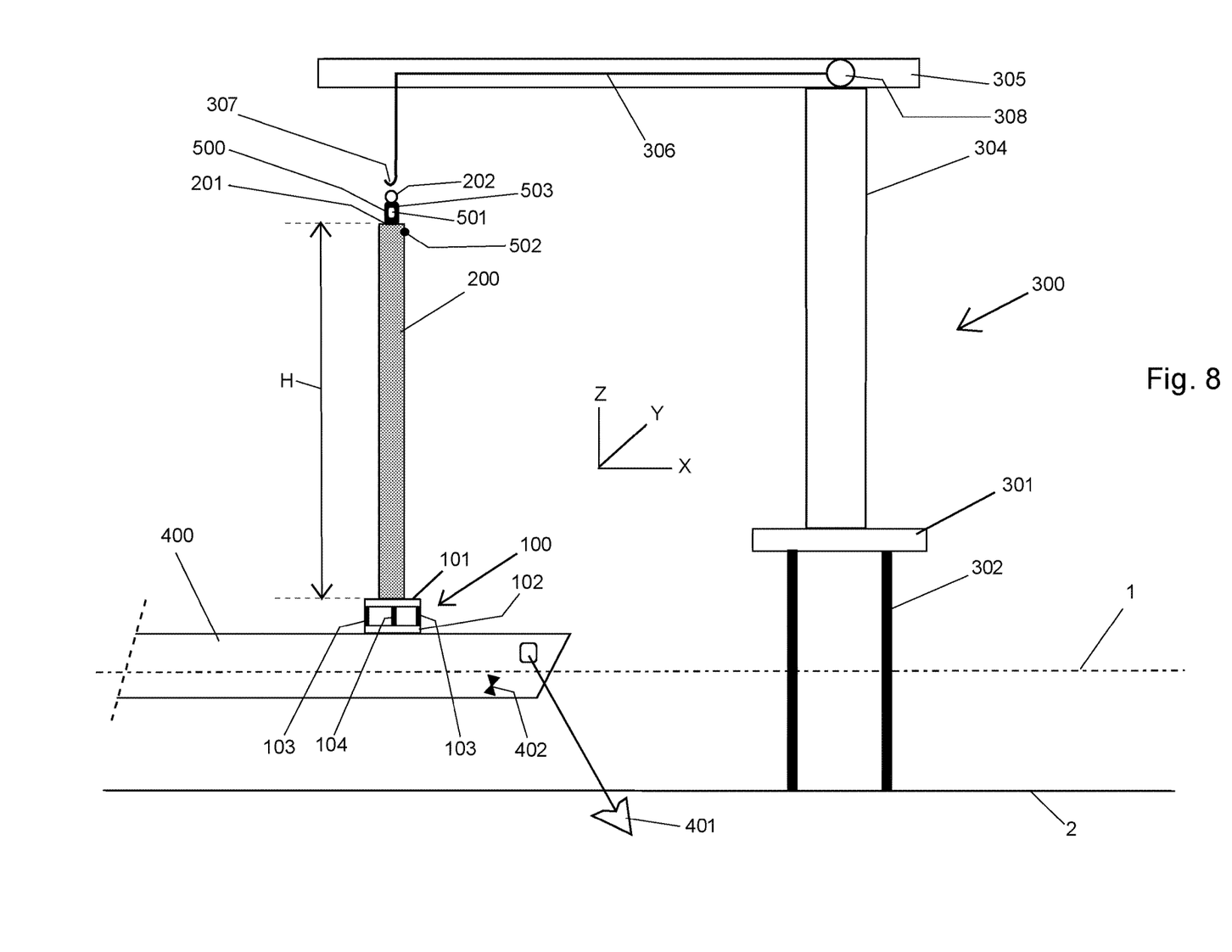
FIG. 8 shows a highly diagrammatic representation of a second exemplary embodiment of the assembly according to the invention.

Before explaining the invention in more detail, a few concepts relating to movements of a vessel will first be explained in more detail with reference to FIGS. 7-8. FIGS. 7-8 show a vessel on the water. The water level is denoted by reference numeral 1 and the bottom, such as a seafloor, is denoted by reference numeral 2. A vessel 400 on the water has six degrees of movement freedom in which the vessel is subjected to movements due to the movement of the water. These are three translational movements and three rotating movements. Using a mathematical approach based on a system of Cartesian coordinates with an imaginary system of three orthogonal axes—a x-axis, y-axis and z-axis—these six movements may be referred to as the x-axis translational movement, y-axis translational movement, z-axis translational movement, x-axis rotating movement, y-axis rotating movement and z-axis rotating movement. It should be noted that, from a mathematical point of view, other equivalent ways of defining the 6 degrees of movement also exist, for example: the three axes used do not have to be orthogonal with respect to each other or a so-called spherical coordinate system may be used. It only requires a mathematical calculation to turn one definition of 6 degrees of freedom of movement into another definition of 6 degrees of freedom of movement. Using the so-called system of Cartesian coordinates and defining the z-axis as vertical, defining the x-axis as extending in the longitudinal direction of a vessel and defining the y-axis as extending in the transverse direction of the vessel:

the x-axis translational movement is referred to in practice as surging,
the y-axis translational movement is referred to in practice as swaying,
the z-axis translational movement is referred to in practice as heaving,
the x-axis rotating movement is referred to in practice as rolling,
the y-axis rotating movement is referred to in practice as pitching, and the z-axis rotating movement is referred to in practice as yawing.

FIGS. 1-4 show a motion compensation platform 100 according to the invention. This platform 100 comprises a bearing frame 101 on which an object can be placed, and a base 102 which can be attached to the vessel (not shown in FIGS. 1-4). The platform comprises an x-y actuator system with two cylinder/piston units 105, which is configured to move the bearing frame 101 about the x-axis and/or the y-axis with respect to the base 102.

The platform furthermore comprises a sensor system 601 that is configured for detecting an x-axis rotating movement and a y-axis rotating movement of, in this example, the base 102. This sensor system is furthermore configured for generating a sensor signal that is representative of the x-axis rotating movement and the y-axis rotating movement which the base is subjected to due to water movement. This sensor signal is passed to an x-y control system 602 which is configured to generate an x-y control signal in response to the sensor signal in order to actuate the x-y actuator system in such a way that the position of the bearing frame 101 with respect to the base 102 is adjusted.

According to a further embodiment, the sensor system 601 may furthermore be configured for detecting an x-axis translational movement and a y-axis translational movement and for generating a sensor signal which is representative of the x-axis translational movement and the y-axis translational movement which the top side 202 (see FIGS. 7-8) of an object 200 which has been placed on the bearing frame (see FIGS. 7-8) is subjected to. In this embodiment, the x-y control system 602 may be configured to generate an x-y control signal in response to the sensor signal which actuates the x-y actuator system so as to minimize changes in the x-position and y-position of the top side 202 of the object 200.

By means of a three-point support, the bearing frame 101 is supported by the base 102 at a vertical distance above the base. This three-point support consists of a first support 104, which is a hinged, fixed support, and a second and third support 103, which each comprise a hinged support which is movable in the longitudinal direction of the z-axis and is in particular telescopic.

The telescopic supports 103 each have a cylinder/piston unit 105 which forms part of the x-y actuator system.

Each cylinder/piston unit 105 is connected to the base 102 by means of a base-hinge 107 and to the bearing frame 101 by means of a bearing frame-hinge 106. Both hinges 106 and 107 may be a ball hinge or another kind of hinge which can hinge at least about the x-axis and about the y-axis and, although not necessarily preferably, can also hinge about the z-axis.

In this example, the first support 104 consists of a vertical column 108 which, in this example, only has a hinge 109 at the top side. This hinge 109 may be a ball hinge or another kind of hinge which can hinge at least about the x-axis and about the y-axis and, although not necessarily preferably, can also hinge about the z-axis. The first support 104 is a fixed support, with the adjective 'fixed' here indicating that this support defines a predetermined 'fixed distance' between the bearing frame and the base. The expression 'fixed distance' is in this case understood to mean a distance which does not change or is unchanging during movement-compensating operation of the platform. If the first support were to have a hinge at the top side and the bottom side, which, according to another embodiment of the invention, is possible, then this fixed distance is measured along the connecting axis which intersects both hinges. If the first support comprises a single hinge on the bottom side or the top side, then the fixed distance may be measured along the vertical z-axis, as is indicated by the distance D in FIG. 3.

The platform 100 furthermore comprises a mechanical constraining system which is configured, on the one hand, to restrict a z-axis rotating movement of the bearing frame with respect to the base and, on the other hand, to restrict or even entirely prevent an x-axis translational movement, a y-axis translational movement, and a z-axis translational movement of the bearing frame with respect to the base. Such a mechanical constraining system may be configured in various ways.

The z-axis rotating movement of the bearing frame 102 with respect to the base 101 may, for example, be restricted by means of a (first) push/pull rod 110 which has an extension in the horizontal direction, optionally strictly horizontal or inclined, and which is attached to the base by one end and is attached to the bearing frame by the other end. In the illustrated embodiment, this push/pull rod 110 extends parallel to the horizontal connecting axis between the two telescopic supports 103, but this direction may also be different. The push/pull rod 110 is supported at an elevated level by the column 111, which is supported by means of struts 112 and 113. Via a hinge 124, the push/pull rod 110 is connected to the base 102 respectively the bearing frame 101 at both ends.

In the illustrated embodiment, the x-axis translational movement, the y-axis translational movement, and the z-axis translational movement of the bearing frame with respect to the base are restricted by means of the column 108 and the ball hinge 109. In the illustrated embodiment, these translational movements are even virtually entirely prevented by the fact that the column 108 is supported by struts 115.

Figure 5:
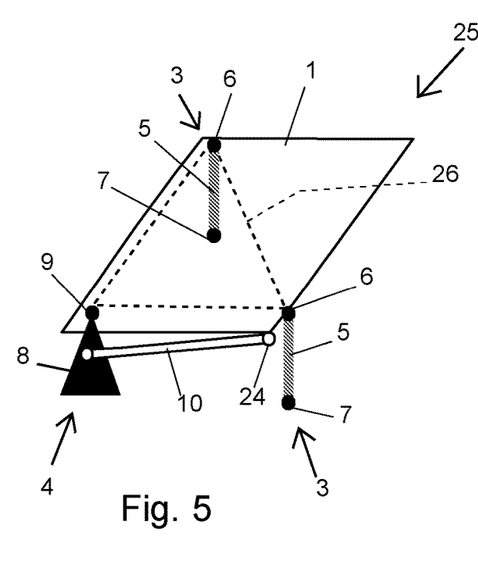
FIG. 5 shows a highly diagrammatic representation in perspective of the platform according to FIGS. 1-4.

FIG. 5 shows a highly diagrammatic representation of the platform according to FIGS. 1-4, which platform in FIG. 5 is denoted by reference numeral 25a. In FIG. 5, parts which correspond to those in FIGS. 1-4 are denoted by the reference numeral from FIGS. 1-4 minus 100. Thus, the part with reference numeral 1 in FIG. 5 corresponds to the part with reference numeral 101 in FIGS. 1-4. In addition, FIG. 5 also shows that the three-point support defines a triangle in the horizontal plane by means of dashed line 26.

Figure 6:
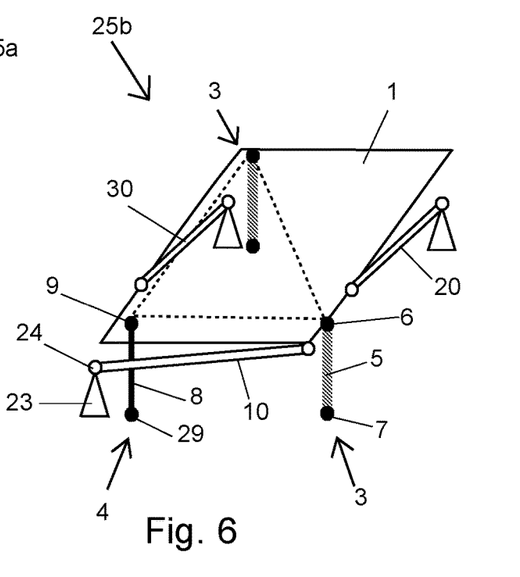
FIG. 6 shows a highly diagrammatic representation in perspective of another embodiment of the platform according to the invention.

FIG. 6 also shows a highly diagrammatic representation of a variant of the platform according to FIGS. 1-4 and 5. Identical or similar parts in FIG. 6 have been denoted by the same reference numerals as in FIG. 5.

The difference between FIG. 6, on the one hand, and FIGS. 1-5, on the other hand, is in particular the first support 4. In the embodiment according to FIG. 6, this first support 4 is formed by a supporting member 8 which is connected to the base at the bottom end by means of hinge 29, for example a ball hinge, and is connected to the bearing frame 1 at the top side by means of the hinge 9, for example a ball hinge. The supporting member as such has a fixed, unchanging length or the length is a fixed, unchanging length at least during movement-compensating operation of the platform.

Due to the hinges 9 and 29, the mechanical constraining means for restricting x-axis translation and y-axis translation which is present in FIGS. 1-5 has been omitted. This mechanical constraining means for restricting x-axis translation and y-axis translation can be restored by means of a second push/pull rod 20 which is hingedly connected to the bearing frame by one end and is hingedly connected to the base by its other end, and which, viewed in the horizontal plane, is situated at an angle, such as a right angle, with respect to the first push/pull rod 10. If desired, a third push/pull rod 30 may also be used which may, in a further embodiment, run parallel to the second push/pull rod.

FIG. 7 and FIG. 8 show a first and second embodiment, respectively, of the assembly according to the invention. This assembly comprises:
  a vessel 400,
  a load 200 in the form of a tower section of a wind turbine, which tower section has a height H of, for example, 45 to 55 metres,
  a crane 300, and
  a heave compensator 500.

In this example, the crane 300 is situated on a jack-up barge 301 with legs 302 which rest on the seafloor. The crane 300 is thus a fixed crane, that is to say a crane which is fixed with respect to the fixed world. Incidentally, according to another embodiment of the invention, the crane 300 may also be a crane which is installed on a floating vessel and may thus be a crane which moves with respect to the fixed world as a result of water movement.

A platform 100 is mounted on the vessel, for example the platform 100 illustrated in FIGS. 1-4. In FIGS. 7-8, the bearing frame 101, the base 102, the first support 104 and the second and third support 103 are shown diagrammatically.

The vessel 400 is furthermore provided with an anchoring system 401 and a dynamic positioning system 402.

In principle, the crane 300 may be any type of crane. In the illustrated example, the crane has a column 304 on which a single-part boom 305 is provided, which boom has a reel 308 for hauling in and easing a hoisting cable 306. The hoisting cable is provided with a gripper 307. In the embodiment from FIG. 7, this is a gripper 307 with two clamping jaws, and in the embodiment from FIG. 8, this is a gripper 307 in the form of a crane hook. The grippers 307 from FIGS. 7 and 8 may also be swapped and other types of grippers may also be used in FIG. 7 and FIG. 8.

First, the embodiment from FIG. 7 will be discussed in greater detail below, followed by the embodiment of FIG. 8.

In the embodiment from FIG. 7, the heave compensator 500 comprises a z-actuator 502 which is provided on the crane and which, in this example, is fitted between two hoisting cable sections. Such a z-actuator for compensating heave may, as is known per se from the prior art, also be provided elsewhere on the crane. The z-actuator may, for example, also be horizontal and be fitted in the boom between two hoisting cable sections. According to another example, the z-actuator may also be incorporated in the winch, in which case the heave compensation is effected by easing or pulling in the hoisting cable by means of the winch. It is also conceivable to place the winch on a carriage and operate this carriage by means of the z-actuator for displacement. These are ways to effect heave compensation in a crane which are known per se from the prior art. Also known from the prior art are so-called 'in-hook' compensators, in which the heave in the crane hook is compensated for by means of a z-actuator incorporated in the crane hook.

The heave compensator 500 furthermore comprises a z-sensor 502 which is configured for detecting a z-axis movement of the gripper with respect to the load engagement point 202 on the top side 201 of the load 200. The z-sensor 502 generates a signal which is representative of this z-axis movement and the z-control system 503 is configured to generate, when the gripper is within a predetermined distance of the load engagement point and/or of the vessel, a control signal in response to this signal from the z-sensor by means of which the z-actuator is actuated to prevent the gripper and the load from hitting or bumping into each other (in an uncontrolled manner). According to a further embodiment, when the gripper is beyond this predetermined distance, this z-control system may be inoperative. The z-sensor may be a conventional movement sensor, by means of which a displacement and/or speed and/or acceleration is measured, but also z-sensors with other measuring principles are conceivable. Thus, it is known, for example, to measure the z-axis movement by applying nominal tension to the hoisting cable, measuring this tension and determining the z-axis movement from the change in this nominal tension. This may be effected, for example, by fitting a tension cable at nominal tension between the load and the gripper and measuring the tension in the tension cable.

The embodiment from FIG. 8 differs from that of FIG. 7 in the positioning of the heave compensator 500. With the embodiment from FIG. 8, the z-actuator 502 is placed between the load 200 and the load engagement point 202. In FIG. 8, the z-actuator is actuated to displace the load engagement point 202 with respect to the load 200. For the rest, the operation of the embodiment according to FIG. 8 is identical to that of the embodiment according to FIG. 7.

Embodiments of the invention are defined further in the following clauses:

1: Assembly comprising:
an object with a vertical height of at least 30 metres, such as 30-50 metres or higher,
a motion compensation platform, comprising:
a base which is attachable to a vessel, and
a bearing frame on which the object is placeable or has been placed,
wherein the platform furthermore comprises:
an x-y actuator system configured to rotate the bearing frame with respect to the base about an x-axis and a y-axis, wherein the x-axis, the y-axis and a vertical z-axis together define an imaginary system of orthogonal axes;
a sensor system configured to i) detect:
an x-axis rotating movement, and
a y-axis rotating movement,
and to ii) generate a sensor signal which is representative of an x-axis rotating movement and a y-axis rotating movement which the base is subjected to due to water movement; and
an x-y control system configured to generate an x-y control signal in response to the received sensor signal in order to actuate the x-y actuator system in such a way that the position of the bearing frame with respect to the base is adjusted;
wherein the bearing frame is supported at a vertical distance above the base by means of a three-point support;
wherein a first support of the three-point support is a hinged, fixed support, which first, fixed support comprises a first hinge and is configured to:
during the movement-compensating operation of the platform, define a predetermined fixed distance between the bearing frame and the base at the location of the first, fixed support, and
by means of the first hinge, allow an x-axis rotating movement and a y-axis rotating movement of the bearing frame with respect to the base; and
wherein a second and third support of the three-point support each comprise a hinged support which is telescopic in the longitudinal direction of the z-axis, which telescopic supports form part of the x-y actuator system and are configured to be able to adjust the vertical distance between the bearing frame and the base at the location of the respective telescopic support, actuated by the x-y control signal, in such a way that the angular position of the bearing frame with respect to the base changes in order to be able to counteract changes in the angular position of the bearing frame with respect to the x-y plane.

2: Assembly according to clause 1,
wherein the sensor system is furthermore configured to i) detect:
an x-axis translational movement, and
a y-axis translational movement,
and to ii) generate a sensor signal which is representative of an x-axis translational movement and a y-axis translational movement which the top side of the object would be subjected to due to water movement; and
wherein the x-y control system is configured to generate an x-y control signal in response to the received sensor signal which actuates the x-y actuator system in such a way that changes in the x-position and the y-position of the top side of the object are counteracted, in particular are minimized.

3: Assembly according to clause 1 or 2, wherein the projection of the first, second and third support on the horizontal plane enclosed by the x-axis and y-axis defines three corners of a triangle, such as the corners of an isosceles or equilateral triangle.

4: Assembly according to one of the preceding clauses, wherein the second and third support each consist of a cylinder-piston-actuator unit which is connected to the base via a base-hinge and is connected to the bearing frame via a bearing frame-hinge, wherein the bearing frame-hinge is configured to allow an x-axis rotating movement and a y-axis rotating movement of the bearing frame with respect to the cylinder-piston-actuator, and wherein the base-hinge is configured to allow an x-axis rotating movement and a y-axis rotating movement of the base with respect to the cylinder-piston-actuator.

5: Assembly according to one of the preceding clauses, wherein the first support consists of a rigid structural part which defines the predetermined fixed distance, and a hinge, in such a way that, at the location of the first support, a translation-less connection between the bearing frame and the base is achieved.

6: Assembly according to one of the preceding clauses, wherein the platform furthermore comprises a mechanical constraining system which is configured to:
restrict a z-axis rotating movement of the bearing frame with respect to the base, and
restrict or prevent an x-axis translational movement, a y-axis translational movement, and a z-axis translational movement of the bearing frame with respect to the base.

7: Assembly according to clause 6, wherein the mechanical constraining system comprises a first push/pull rod which extends in a horizontal direction and which is attached, on the one hand, to the base and, on the other hand, to the bearing frame in order to restrict the z-axis rotating movement of the bearing frame with respect to the base.

8: Assembly according to clause 7, wherein the mechanical constraining system comprises a second push/pull rod which extends in a horizontal direction and which is attached, on the one hand, to the base and, on the other hand, to the bearing frame and which, viewed in the horizontal plane, runs at an angle to the first push/pull rod in order to restrict an x-axis translational movement and a y-axis translational movement of the bearing frame with respect to the base together with the first push/pull rod.

9: Assembly according to one of the clauses 6-8, wherein the mechanical constraining system comprises the first support which is configured to prevent the x-axis translational movement, the y-axis translational movement, and the z-axis translational movement of the bearing frame with respect to the base.

10: Assembly according to one of the preceding clauses 1-9, furthermore comprising a vessel, wherein the platform is mounted on the vessel and the object is situated on the bearing frame with its vertical height extending in the z-direction.

11: Assembly according to clause 9 or 10, wherein the vessel is provided with an anchoring system and/or a dynamic positioning system, and wherein the anchoring system and/or a dynamic positioning system are configured to counteract or even prevent an x-axis translational movement, a y-axis translational movement and a z-axis rotating movement of the vessel.

12: Assembly according to one of clauses 10-11, wherein the assembly furthermore comprises:
  a load which is provided with a load engagement point and a crane which is provided with a gripper configured for picking up the load at the load engagement point, wherein the object is the load or the crane; and
  a heave compensator comprising:
    a z-actuator configured to:
      move the gripper with respect to the fixed world, or
      move the load engagement point with respect to the load;
    a z-sensor configured for detecting a z-axis movement of the gripper with respect to the load engagement point in the direction of the z-axis and for generating a z-sensor signal which is representative of the detected z-axis movement;
    a z-control system which is configured to generate, when the gripper is within a predetermined distance of the load engagement point and/or of the vessel, a z-control signal in response to the z-sensor signal which actuates the z-actuator in such a way that the load is prevented from hitting the gripper, due to the z-axis movement.

13: Assembly according to clause 12, wherein the object is the load.

14: Assembly according to clause 13, wherein the crane is a crane which is fixed with respect to the fixed world, such as a crane placed on a jack-up barge.

15: Assembly according to clause 12, wherein the object is the crane.

16: Assembly according to clause 15, wherein the load is situated outside the vessel.

17: Assembly according to one of clauses 12-16, wherein the z-actuator is attached on or to the load and is configured to move the load engagement point in the z-axis direction with respect to the rest of the load.

18: Assembly according to one of clauses 12-16, wherein the z-actuator is attached on or to the crane and is configured to move the gripper in the z-axis direction with respect to the fixed world.

19: Assembly according to one of clauses 1-18, wherein the object is a tower or tower section of a wind turbine.

20: Platform from the assembly according to one of the preceding clauses.

21: Use of an assembly according to one of clauses 1-19 for the offshore unloading of a tower or tower section of a wind turbine which has been arranged vertically on a vessel.

22: Use according to clause 21, wherein the tower or tower section is arranged in vertical position on the bearing frame during loading onto the vessel; after loading, the tower or tower section is then taken to its offshore destination by the vessel and the tower or tower section is unloaded at its offshore destination.

The invention claimed is:
1. An assembly comprising:
a vessel,
an object with a vertical height of at least 30 metres, such as 30-50 metres or higher,
  a motion compensation platform, comprising:
    a base which is attachable to a vessel, and
    a bearing frame on which the object is placeable or has been placed,
wherein the platform furthermore comprises:
an x-y actuator system configured to rotate the bearing frame with respect to the base about an x-axis and a y-axis, wherein the x-axis, the y-axis and a vertical z-axis together define an imaginary system of orthogonal axes;
a sensor system configured to i) detect:
  an x-axis rotating movement, and
  a y-axis rotating movement,
and to ii) generate a sensor signal which is representative of an x-axis rotating movement and a y-axis rotating movement which the base is subjected to due to water movement; and
an x-y control system configured to generate an x-y control signal in response to the received sensor signal in order to actuate the x-y actuator system in such a way that the position of the bearing frame with respect to the base is adjusted;
wherein the platform is mounted on the vessel and the object is situated on the bearing frame with its vertical height extending in the z-direction,
wherein the bearing frame is supported at a vertical distance above the base by means of a three-point support, which three-point support consists of a first support, a second support and a third support;
wherein the first support of the three-point support is a hinged, fixed support, which first, fixed support comprises a first hinge and is configured to:
during the movement-compensating operation of the platform, define a predetermined fixed distance between the bearing frame and the base at the location of the first, fixed support, and
by means of the first hinge, allow an x-axis rotating movement and a y-axis rotating movement of the bearing frame with respect to the base;
wherein the second and the third support of the three-point support each comprise a hinged support which is telescopic in the longitudinal direction of the z-axis, which telescopic supports form part of the x-y actuator system and are configured to be able to adjust the vertical distance between the bearing frame and the base at the location of the respective telescopic support, actuated by the x-y control signal, in such a way that the angular position of the bearing frame with respect to the base changes in order to be able to counteract changes in the angular position of the bearing frame with respect to the x-y plane;

wherein, at the top side of the object, the object is provided with a load engagement point;

wherein the assembly furthermore comprises:
a crane which is fixed with respect to the fixed world and is provided with a gripper configured for picking up the object at the load engagement point, and
a heave compensator comprising:
a z-actuator configured to:
move the gripper with respect to the fixed world, or
move the load engagement point with respect to the object;
a z-sensor configured for detecting a z-axis movement of the gripper with respect to the load engagement point in the direction of the z-axis and for generating a z-sensor signal which is representative of the detected z-axis movement;
a z-control system which is configured to generate, when the gripper is within a predetermined distance of the load engagement point and/or of the vessel, a z-control signal in response to the z-sensor signal which actuates the z-actuator in such a way that the object is prevented from hitting the gripper, due to the z-axis movement.

2. The assembly according to claim 1,
wherein the sensor system is furthermore configured to i) detect:
an x-axis translational movement of the vessel, and
a y-axis translational movement of the vessel,
and to ii) generate a sensor signal which is representative of an x-axis translational movement and a y-axis translational movement which the top side of the object would be subjected to due to water movement; and
wherein the x-y control system is configured to generate an x-y control signal in response to the received sensor signal which actuates the x-y actuator system in such a way that changes in the x-position and the y-position of the top side of the object are counteracted, in particular are minimized.

3. The assembly according to claim 1, wherein the projection of the first, second and third support on the horizontal plane enclosed by the x-axis and y-axis defines three corners of a triangle, such as the corners of an isosceles or equilateral triangle.

4. The assembly according to claim 1, wherein the second and third support each consist of a cylinder-piston-actuator unit which is connected to the base via a base-hinge and is connected to the bearing frame via a bearing frame-hinge, wherein the bearing frame-hinge is configured to allow an x-axis rotating movement and a y-axis rotating movement of the bearing frame with respect to the cylinder-piston-actuator, and wherein the base-hinge is configured to allow an x-axis rotating movement and a y-axis rotating movement of the base with respect to the cylinder-piston-actuator.

5. The assembly according to claim 1, wherein the first support consists of a rigid structural part which defines the predetermined fixed distance, and a hinge, in such a way that, at the location of the first support, a translation-less connection between the bearing frame and the base is achieved.

6. The assembly according to claim 1, wherein the platform furthermore comprises a mechanical constraining system which is configured to:
restrict a z-axis rotating movement of the bearing frame with respect to the base, and
restrict or prevent an x-axis translational movement, a y-axis translational movement, and a z-axis translational movement of the bearing frame with respect to the base.

7. The assembly according to claim 6, wherein the mechanical constraining system comprises a first push/pull rod which extends in a horizontal direction and which is attached, on the one hand, to the base and, on the other hand, to the bearing frame in order to restrict the z-axis rotating movement of the bearing frame with respect to the base.

8. The assembly according to claim 7, wherein the mechanical constraining system comprises a second push/pull rod which extends in a horizontal direction and which is attached, on the one hand, to the base and, on the other hand, to the bearing frame and which, viewed in the horizontal plane, runs at an angle to the first push/pull rod in order to restrict an x-axis translational movement and a y-axis translational movement of the bearing frame with respect to the base together with the first push/pull rod.

9. The assembly according to claim 6, wherein the mechanical constraining system comprises the first support which is configured to prevent the x-axis translational movement, the y-axis translational movement, and the z-axis translational movement of the bearing frame with respect to the base.

10. The assembly according to claim 9, wherein the vessel is provided with an anchoring system and/or a dynamic positioning system, and wherein the anchoring system and/or a dynamic positioning system are configured to counteract or even prevent an x-axis translational movement, a y-axis translational movement and a z-axis rotating movement of the vessel.

11. The assembly according to claim 1, wherein the crane is placed on a jack-up barge.

12. The assembly according to claim 1, wherein the z-actuator is attached on or to the object and is configured to move the load engagement point in the z-axis direction with respect to the rest of the object.

13. The assembly according to claim 1, wherein the z-actuator is attached on or to the crane and is configured to move the gripper in the z-axis direction with respect to the fixed world.

14. The assembly according to claim 1, wherein the object is a tower or tower section of a wind turbine.

* * * * *